US012763505B2

(12) United States Patent
Muralidharan

(10) Patent No.: US 12,763,505 B2
(45) Date of Patent: Oct. 13, 2026

(54) CONNECTOR FOR MEMORY STICK

(71) Applicant: SMART Modular Technologies, Inc., Newark, CA (US)

(72) Inventor: Roshan Muralidharan, San Jose, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 348 days.

(21) Appl. No.: 18/647,559

(22) Filed: Apr. 26, 2024

(65) Prior Publication Data

US 2025/0337182 A1 Oct. 30, 2025

(51) Int. Cl.

| | |
|---|---|
| ***H01R 12/87*** | (2011.01) |
| ***H01R 12/73*** | (2011.01) |
| ***H01R 13/627*** | (2006.01) |
| ***H01R 43/26*** | (2006.01) |
| *H01R 13/24* | (2006.01) |

(52) U.S. Cl.

CPC ........... *H01R 12/87* (2013.01); *H01R 12/737* (2013.01); *H01R 13/6273* (2013.01); *H01R 43/26* (2013.01); *H01R 13/24* (2013.01)

(58) Field of Classification Search

CPC .. H01R 12/87; H01R 12/737; H01R 13/6273; H01R 43/26

See application file for complete search history.

(56) References Cited

U.S. PATENT DOCUMENTS 4,159,861 A * 7/1979 Anhalt .................... H01R 12/89 439/267
4,447,101 A * 5/1984 Gugliotti .............. H01R 13/633 439/153
6,116,940 A * 9/2000 Bertens ................ H01R 12/714 439/247
6,572,396 B1 * 6/2003 Rathburn ............. H05K 7/1061 439/260
6,824,413 B1 * 11/2004 Shipe ................. H01R 12/7005 439/157

(Continued)

OTHER PUBLICATIONS

3M, "3M™ Textool™ ZIP DIP Sockets," accessed Aug. 2022 from the Internet: [https://www.3m.com/3M/en_US/p/d/b00035247/], 6 pages.

(Continued)

*Primary Examiner* — Harshad C Patel

(74) *Attorney, Agent, or Firm* — Withrow & Terranova, P.L.L.C.

(57) ABSTRACT

Connectors for memory sticks are disclosed. In one aspect, a connector or receptacle that is configured to couple to a first laminate structure, such as a printed circuit board (PCB), may include lateral jaws, which are opened to receive a second laminate structure, such as a memory stick. As the memory stick is pressed down into the connector, pressure on a trigger causes the jaws to close around the second laminate structure holding the second laminate structure in place. Because placing the second laminate in the connector in this fashion does not immediately force contacts on the second laminate structure against contacts in the connector, wear to both the second laminate structure and the connector is reduced, allowing for repeated insertions and withdrawals without damaging the second laminate structure and/or the connector.

20 Claims, 9 Drawing Sheets

(56) References Cited

U.S. PATENT DOCUMENTS

| | | | | |
|---|---|---|---|---|
| 7,121,862 | B2 * | 10/2006 | Tang | H01R 12/7005 439/327 |
| 7,661,974 | B1 * | 2/2010 | Sun | H01R 12/721 439/328 |
| 8,616,907 | B2 * | 12/2013 | Kim | H01R 12/87 439/260 |
| 8,905,773 | B2 * | 12/2014 | Liang | H01R 12/87 439/260 |
| 9,397,443 | B2 * | 7/2016 | Pade | H01R 13/5208 |
| 10,763,606 | B1 * | 9/2020 | Esmaily | H01R 13/5219 |
| 11,245,224 | B2 * | 2/2022 | Yuan | H01R 12/721 |
| 12,355,167 | B2 * | 7/2025 | Yu | H01R 12/523 |
| 2011/0117768 | A1 * | 5/2011 | Li | H01R 12/7029 439/345 |
| 2015/0340872 | A1 | 11/2015 | Franzon et al. | |
| 2019/0363488 | A1 * | 11/2019 | Xie | H01R 12/7005 |

OTHER PUBLICATIONS

Akahoshi, T. et al., "Configuration for High-speed Transmission between Flip-chip Packages Using Low Loss and Flexible Substrate," Transactions of The Japan Institute of Electronics Packaging, vol. 11, 2018, 6 pages.

Barlow, F. et al., "Low cost flex substrates for miniaturized electronic assemblies," Microelectronics Reliability, vol. 42, Issue 7, Jul. 2002, pp. 1091-1099.

Braunisch, H. et al., "High-Speed Flex-Circuit Chip-to-Chip Interconnects," IEEE Transactions on Advanced Packaging, vol. 31, No. 1, Feb. 2008, IEEE, pp. 82-90.

Chandrasekar, K. et al., "Inductively Coupled Connectors and Sockets for Multi-GB/s Pulse Signaling," IEEE transactions on Advanced Packaging, vol. 31, No. 4, Nov. 2008, IEEE, pp. 749-758.

Hsu, Y.-L. et al., "Shape Optimal Design of Contact Springs of Electronic Connectors," Journal of Electronic Packaging, vol. 124, Issue 3, Sep. 2002, pp. 178-183.

Jedec, "288 PIN DDR4 DIMM, 0.85 MM Pitch," JEDEC Solid State Product Outline, No. MO-309, Issue F, Mar. 2015, 16 pages.

Leong, W.C. et al., "Application of flexible printed circuit board (FPCB) in personal computer motherboards: focusing on mechanical performance," Microelectronics Reliability, vol. 52, No. 4, Apr. 2012, pp. 744-756.

Molex, "DDR4 DIMM Socket, Vertical Press-Fit, 0.76μm Gold Plating, 288 Circuits, PCB Thickness 1.80mm, Tail Length 2.53mm, Black Housing, Black Latch," accessed Apr. 4, 2022 from the Internet: [URL: https://www.molex.com/molex/products/part-detail/memory_module_sock/0787311002], 9 pages.

Molex, "FFC/FPC Connectors," available from the Internet: [URL: https://www.molex.com/molex/products/group/ffc_fpc_connectors], 12 pages.

TE Connectivity, "Memory Sockets," accessed Feb. 21, 2022 from the Internet: [https://www.te.com/usa-en/products/connectors/sockets/memory-sockets.html], 3 pages.

Zhao, W. et al., "A Compact Inductively Coupled Connector for Mobile Devices," 2013 IEEE 63rd Electronic Components and Technology Conference, May 28-31, 2013, Las Vegas, NV, USA, IEEE, pp. 2385-2390.

* cited by examiner

CONNECTOR FOR MEMORY STICK

BACKGROUND

I. Field of the Disclosure

The technology of the disclosure relates generally to connectors that couple devices such as memory sticks to another laminate structure such as a printed circuit board (PCB).

II. Background

Computing devices abound in modern society. The prevalence of these computing devices is driven in part by the many functions that are now enabled on such devices. These functions are enabled by increased processing capabilities, which, in turn, are enabled, in part, by improved memory systems. Memory devices come in a variety of types. One common type is random access memory (RAM), which is generally used by a microprocessor for immediate data storage and retrieval. RAM is available in a variety of formats, which may have a variety of form factors. One popular format and form factor is a dual in-line memory module (DIMM). DIMMs generally have a laminate structure on which memory elements are mounted. These memory elements are accessed by edge contacts along one side of the laminate structure. Normal operation has these edge contacts inserted into a complementary connector on another laminate structure, such as a motherboard. The contacts are forcefully inserted into the connector, which acts like a spring that resists insertion of the contacts while also inducing friction therebetween to hold the DIMM in place and make a good electrical contact. In end products, the insertion and removal of a DIMM from the connector is a rare occurrence. However, before use in an end product, the DIMMs may be tested. The device that performs the test may be a commercial connector that is designed to withstand a few tens of insertions and withdrawals. Using these connectors for production volumes may damage the connectors, which in turn may damage the device under test. Further, such insertions and removals are, given the tolerances of the connectors, done manually. Thus, there is room for innovation for a connector that can withstand numerous automated insertions and withdrawals.

SUMMARY

Aspects disclosed in the detailed description include connectors for memory sticks. In particular, a connector or receptacle that is configured to couple to a first laminate structure, such as a printed circuit board (PCB), may include lateral jaws that are opened to receive a second laminate structure, such as a memory stick. As the memory stick is pressed down into the connector, pressure on a trigger causes the jaws to close around the second laminate structure holding the second laminate structure in place. Because placing the second laminate in the connector in this fashion does not immediately force contacts on the second laminate structure against contacts in the connector, wear to both the second laminate structure and the connector is reduced, allowing for repeated insertions and withdrawals without damaging the second laminate structure and/or the connector.

In this regard, in one aspect, a connector configured to be coupled to a first laminate structure is disclosed. The connector includes a base comprising a longitudinal axis and a pair of end pieces on either end of the base on the longitudinal axis. The connector also includes a cradle comprising a pair of opposing jaws that open and close along a lateral axis perpendicular to the longitudinal axis, wherein each of the jaws comprises an interior face comprising contacts configured to couple electrically to a workpiece, each of the jaws also coupled to a plunger configured to move up and down in a track on a first one of the pair of end pieces and a latch handle pivotably coupled to the plunger and configured to cause the plunger to move up or down in the track.

In another aspect, a method of operating a connector is disclosed. The method includes placing a workpiece in an open cradle, operating a latch handle to drive a plunger down and responsive to the plunger moving down, closing jaws of the open cradle around the workpiece such that contacts on the jaws form an electrical connection with the workpiece.

DETAILED DESCRIPTION

Figure 1:
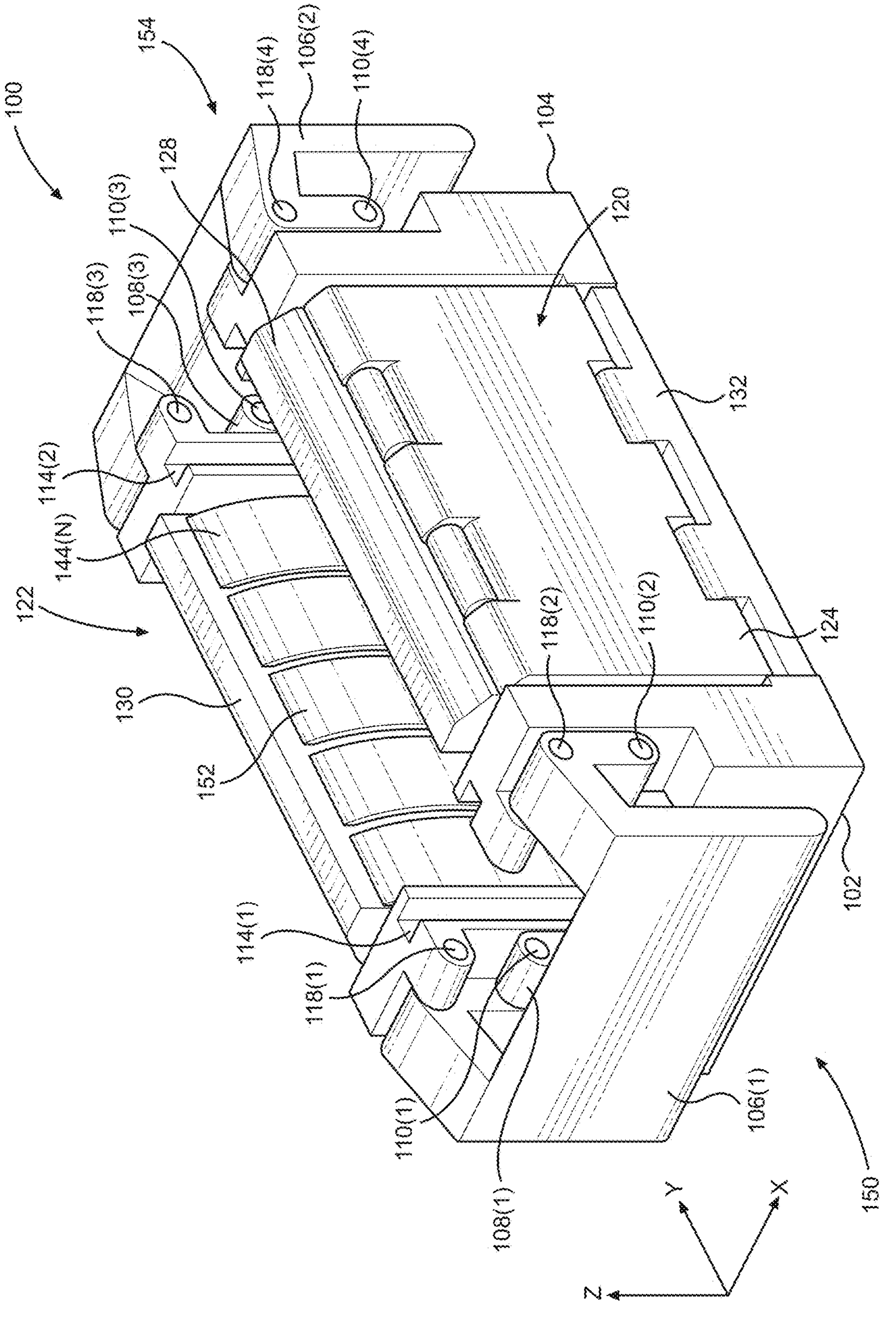
FIG. 1 is a top-front perspective view of a connector according to exemplary aspects of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

To the extent that the term "approximately" is used in the claims, it is herein defined to be within five percent (5%).

Aspects disclosed in the detailed description include connectors for memory sticks. In particular, a connector or receptacle that is configured to couple to a first laminate structure, such as a printed circuit board (PCB), may include lateral jaws that are opened to receive a second laminate structure, such as a memory stick. As the memory stick is pressed down into the connector, pressure on a trigger causes the jaws to close around the second laminate structure holding the second laminate structure in place. Because placing the second laminate in the connector in this fashion does not immediately force contacts on the second laminate structure against contacts in the connector, wear to both the second laminate structure and the connector is reduced, allowing for repeated insertions and withdrawals without damaging the second laminate structure and/or the connector.

Figure 2:
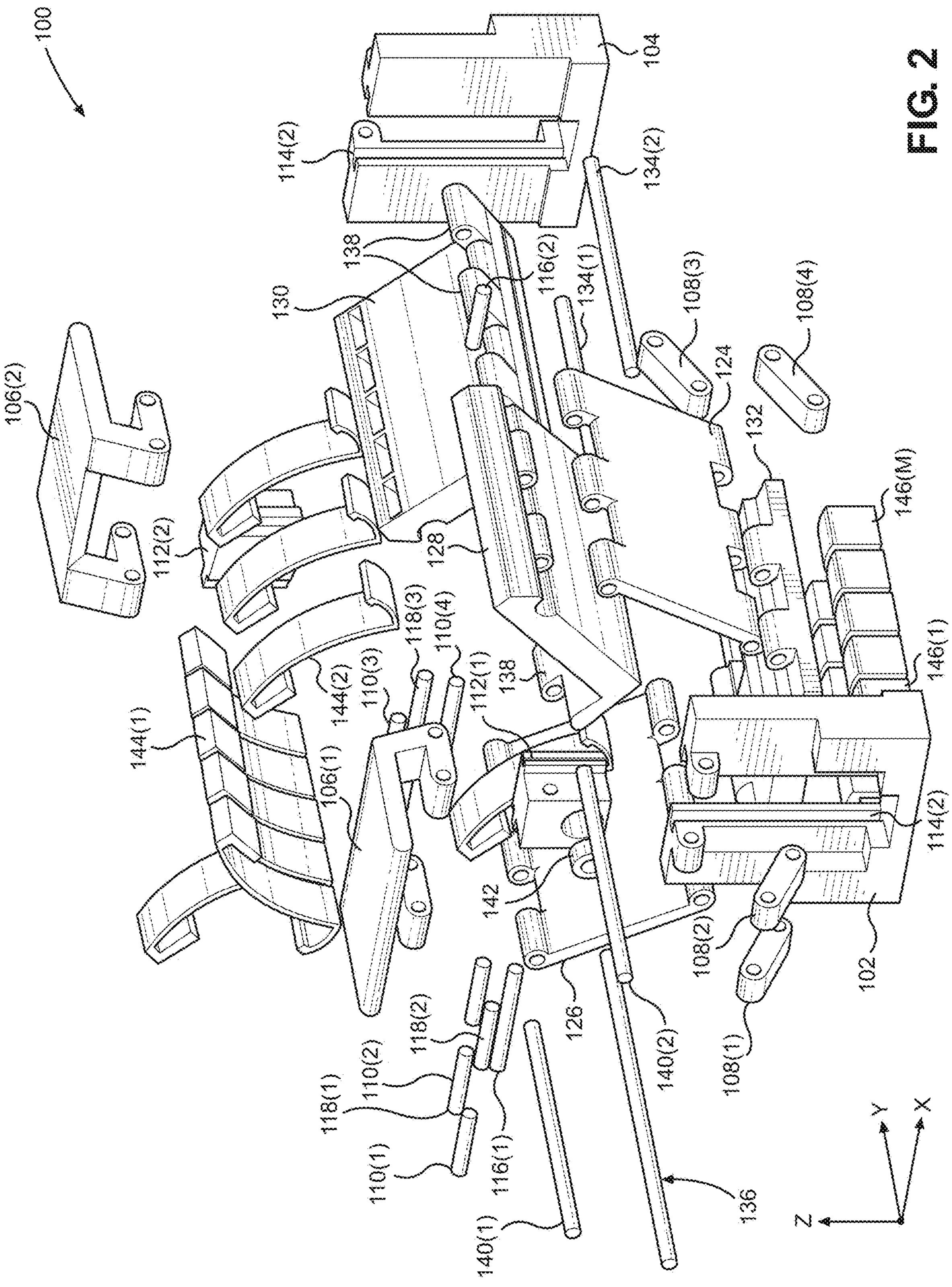
FIG. 2 is an exploded view of the parts of the connector of FIG. 1.

In this regard, FIGS. 1 and 2 illustrate an exemplary connector 100 that can be an alternative to commercially available memory stick connectors and test load board connectors. FIG. 1 illustrates the connector 100 assembled and FIG. 2 provides an exploded view with individual parts more readily visible. As illustrated, the connector 100 is particularly designed for use with dual in-line memory module (DIMM) type memory sticks, but the concepts may be extended to other form factors without departing from the present disclosure. The connector 100 is configured to couple to a first laminate structure such as a printed circuit board (PCB) (not shown in FIG. 1). The connector 100 includes a first end piece 102 and a second end piece 104 longitudinally separated (in the y-axis direction) from one another. Additional views are provided in FIGS. 7A & 7B. Specifically, the rotational engagement of the contacts 144(1)-144(N) to contacts 146(1)-146(M) is better illustrated by the end on-partial views.

Latch handles 106(1), 106(2) are pivotably attached to the end pieces 102, 104, respectively. The latch handles 106(1), 106(2) may be generally U-shaped. The pivot function of the latch handles 106(1), 106(2) is enabled by links 108(1)-108(4) and pins 110(1)-110(4). The links 108(1)-108(4) are coupled to plungers 112(1), 112(2) that slidingly fit in tracks 114(1), 114(2) of the end pieces 102, 104. More specifically, pins 116(1), 116(2) couple the links 108(1)-108(4) to the plungers 112(1), 112(2). Additional pins 118(1)-118(4) couple the latch handle 106(1), 106(2) to the end pieces 102, 104.

Jaws for the connector are formed from a first jaw 120 and a second jaw 122, which are formed from a first support 124 and a second support 126 coupled to interior jaw faces 128, 130, respectively.

A cradle base 132 forms a base and is coupled to the jaws 120, 122 by pins 134(1),134(2). A latch-to-latch pin 136 runs through complementary sleeves 138 on the jaw faces 128, 130. The supports 124, 126 couple to the jaw faces using pins 140(1), 140(2). A set screw collar 142 or an equivalent locking feature may be present as well to contain all the moving parts in the longitudinal axis. Contacts 144(1)-144(N) are configured to couple electrically to contact pads on the memory stick, and contacts 146(1)-146(M) are configured to couple electrically to contacts on a first laminate such as a PCB. Accordingly, the contacts 144(1)-144(N), 146(1)-146(M) are made from a conductive material such as copper, silver, gold, or aluminum.

Figure 7A:
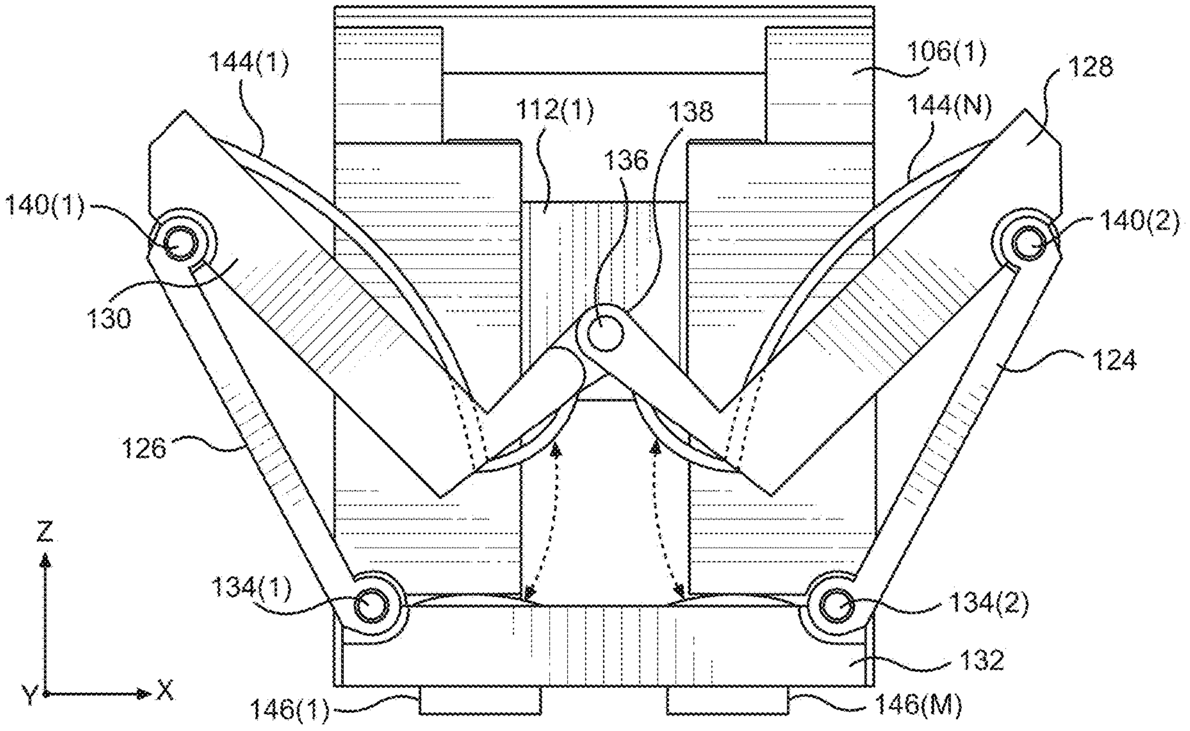
FIG. 7A is a front-side elevational cross-section view of the connector of FIG. 1, showing overlapping springs to form the contacts.
Figure 7B:
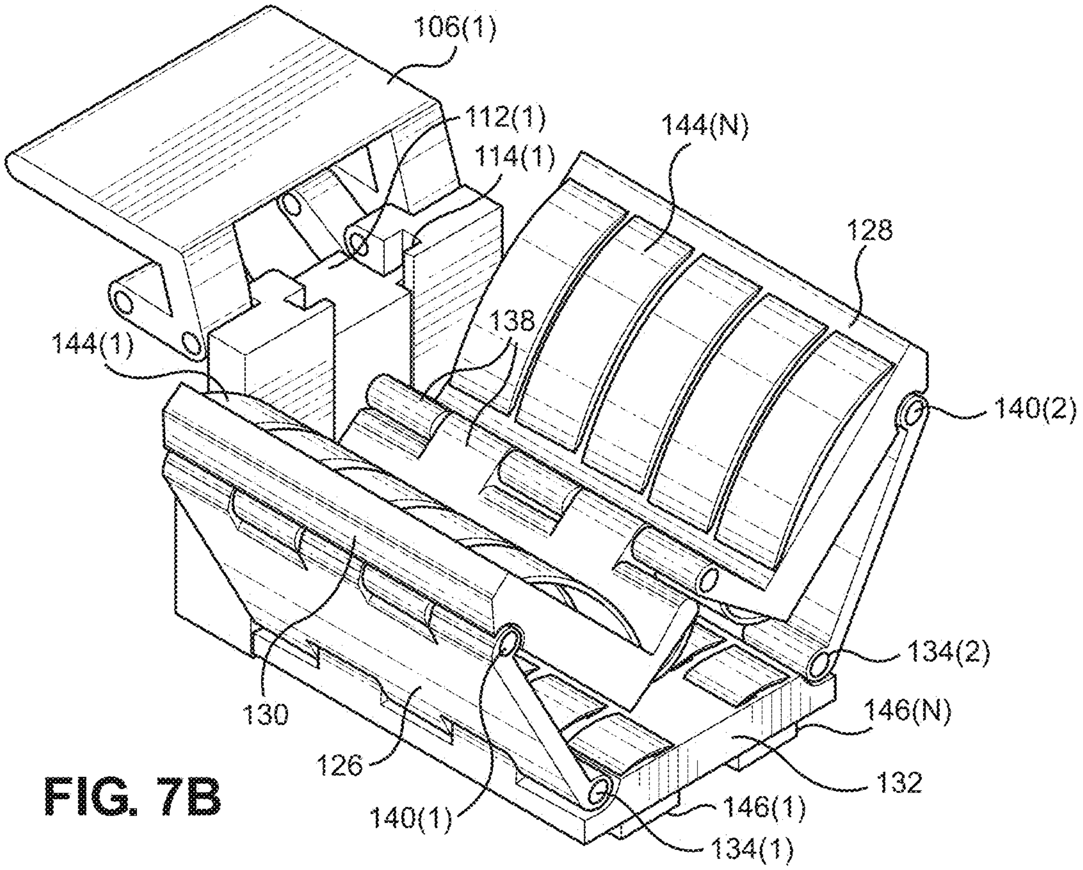
FIG. 7B is an isometric view of the overlapping springs of FIG. 7A.

The above discussion is a parts-level discussion. It should be appreciated that some parts may be combined or further subdivided without departing from the present disclosure. In general, there are three conceptual parts, namely a base 150 with end pieces 102, 104 to support the contacts 146(1)-146(M); a cradle 152 on the base 150 in which nests the memory stick (the cradle 152 is formed from the jaws 120, 122); and a latch 154, which acts as a toggle mechanism to press the contacts 144(1)-144(N) against complementary contacts on the memory stick and further cause contacts 144(1)-144(N) to couple electrically to contacts 146(1)-146(M) within the connector 100. As seen in FIGS. 7A, when the cradle 152 is open, the contacts 144(1)-144(N) are lifted up and away from the contacts 146(1)-146(M), but it is also readily apparent that when the cradle 152 closes, the contacts 144(1)-144(N) rotate down and into contact with the contacts 146(1)-146(M), thereby establishing an electrical connection.

The connector 100 works by effectively removing a cause of friction acting on the memory stick (i.e., there is no insertion into the connector 100, and there are no corresponding forces from such insertion).

Figure 3:
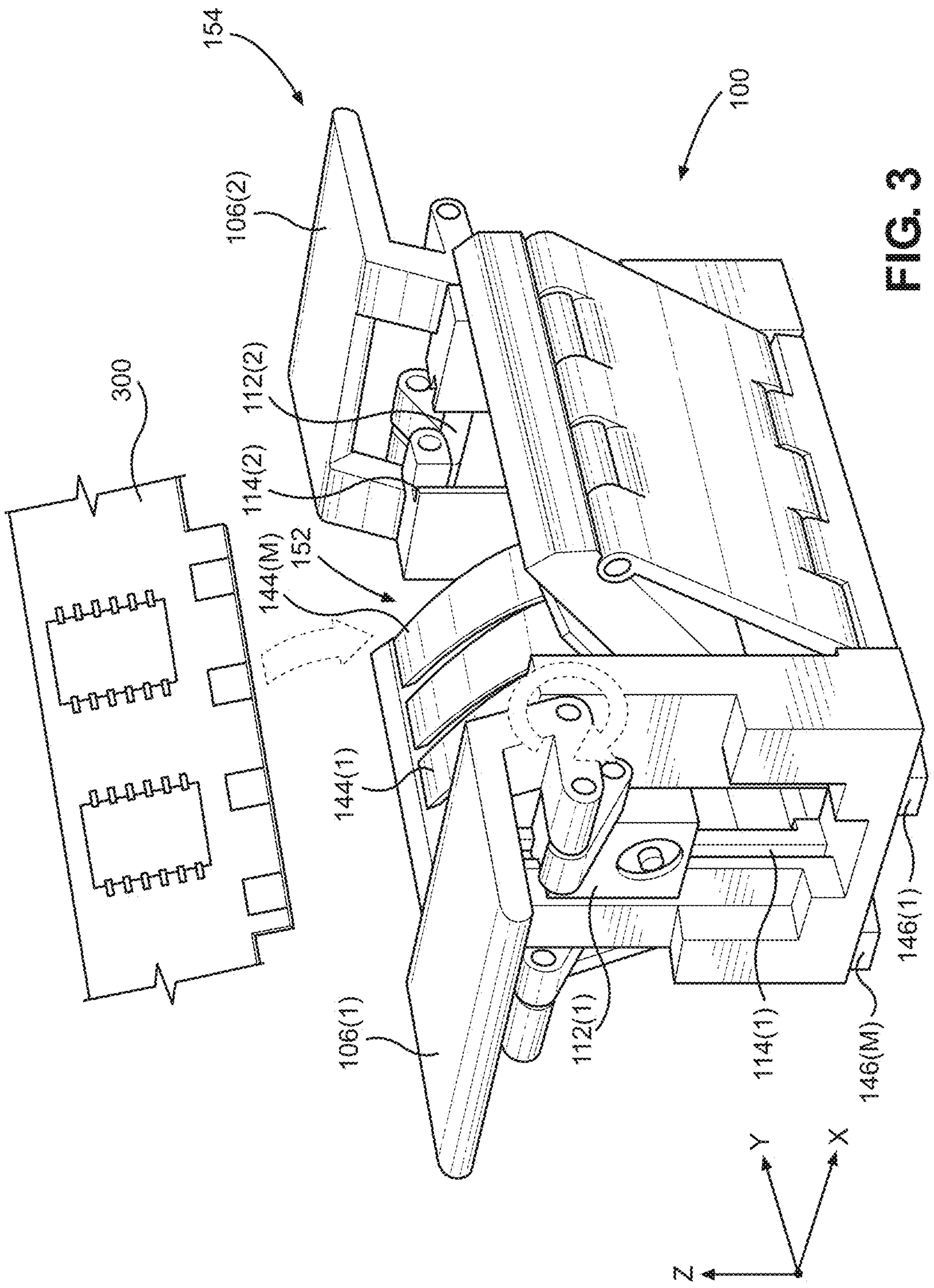
FIG. 3 is a top-front perspective view of a second laminate structure being placed into the connector of FIG. 1.
Figure 4:
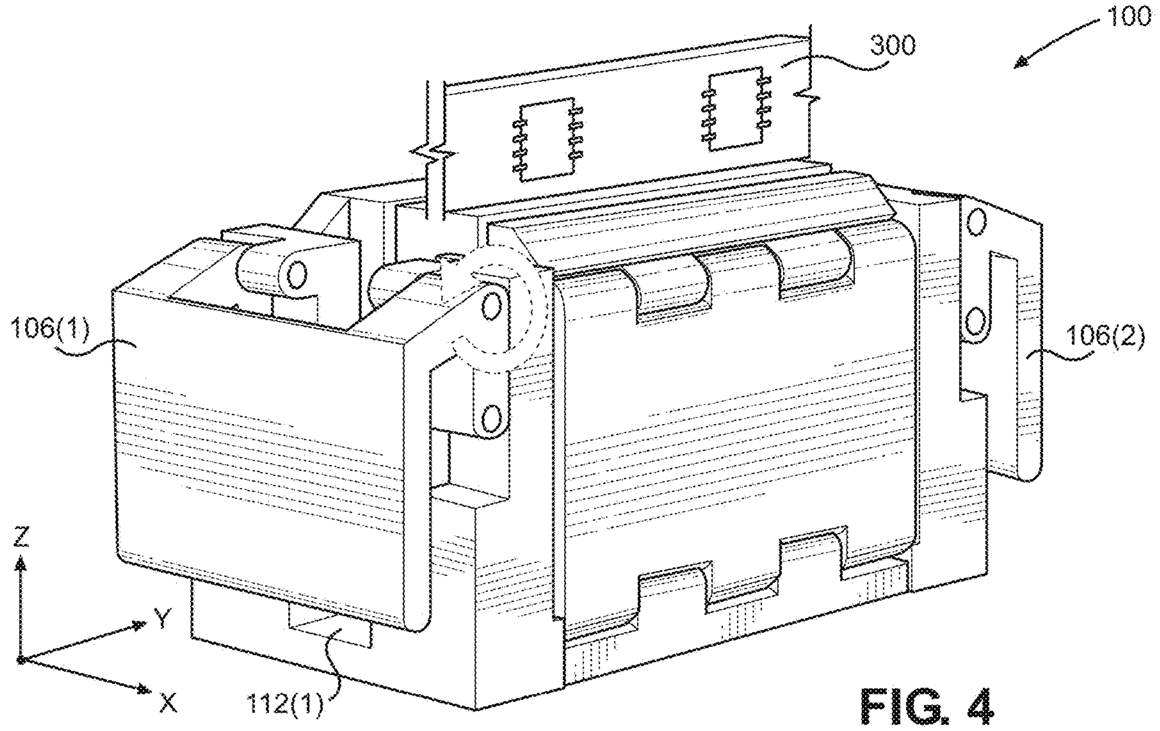
FIG. 4 is a top-front perspective view of the second laminate secured within the connector of FIG. 1.

As better seen in FIGS. 3 and 4, the connector 100 allows placing a memory stick 300 into the connector 100 instead of inserting. Insertion, as used herein, means using active force to press against a resistive component. That is, not just the weight of the memory stick 300 is moved, but the necessary contact force for electrical continuity (combination of part geometry, material properties, insertion angle and friction) is overcome. In contrast, placing is merely laying the memory stick into the cradle. Further, the cradle 152 is flexible enough to compensate for automation tolerances. The opening and closing of the cradle 152 are linked to the plunger 112(1), 112(2) vertical movement. As the plunger 112(1), 112(2) moves vertically (i.e., in the z-direction) up and down the tracks 114(1), 114(2), the latch handles 106(1), 106(2) rotate. Likewise, rotation of the latch handles 106(1), 106(2) causes the plunger 112(1), 112(2) to go up and down the tracks 114(1), 114(2).

Thus, as seen in FIG. 3, the memory stick 300 is placed into the cradle 152 while the cradle 152 is open and the latch handles 106(1), 106(2) are raised (and the plunger 112(1), 112(2) is up). Then, as seen in FIG. 4, once the memory stick 300 is in place, the latch handles 106(1), 106(2) are rotated in the opposite directions to bring the cradle 152 down, lowering the memory stick 300 and vertically aligning the memory stick 300. The toggle mechanism allows the latch to be locked when the three links overlap each other. This locking provides necessary and sufficient contact force for electrical continuity between the memory stick 300 and the contacts 144(1)-144(N) and between contacts 144(1)-144(N) and contacts 146(1)-146(M) within the connector.

Figure 5:
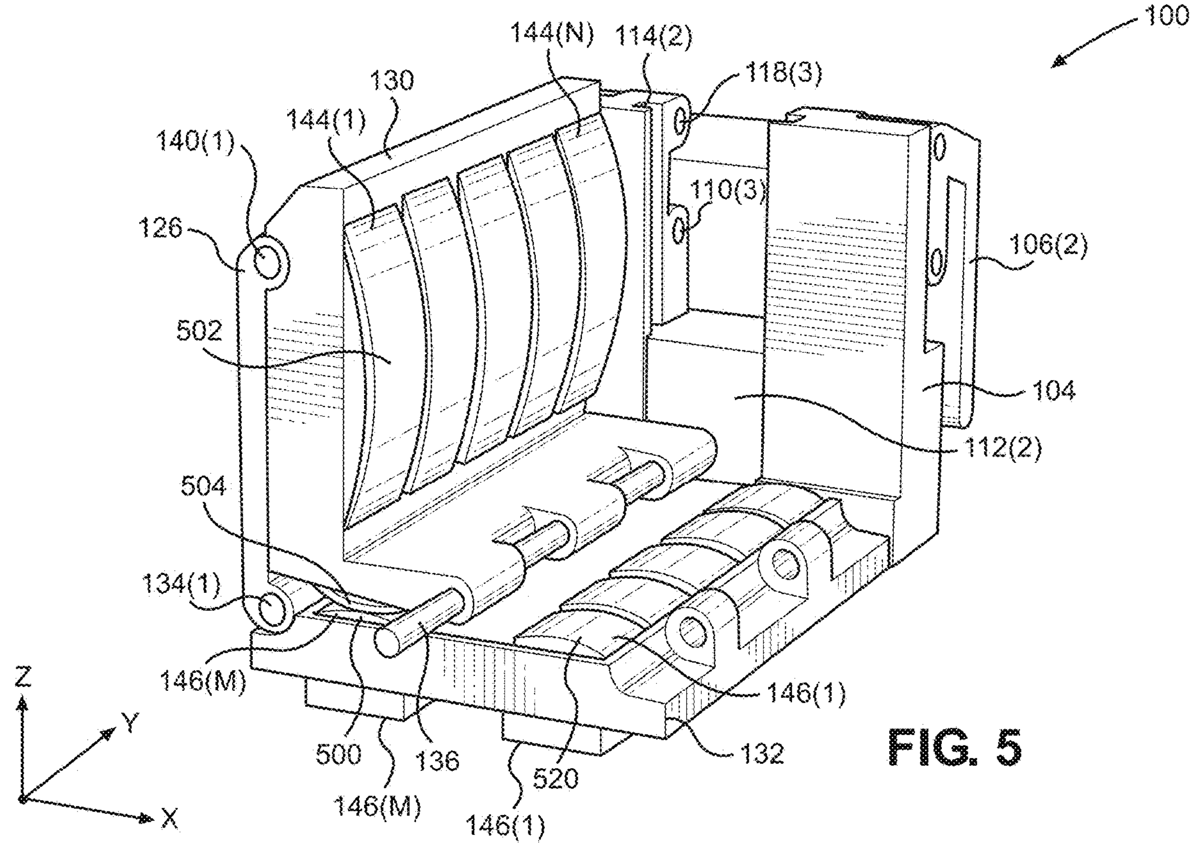
FIG. 5 is a partial cross-section of the connector of FIG. 1 to illustrate electrical connections within the connector that allow electrical connections between a first laminate structure and a second laminate structure.

FIG. 5 provides a partial cutaway view of the connector 100 showing how the contacts 144(1)-144(N) electrically contact the contacts 146(1)-146(M). Specifically, the contacts 146(1)-146(M) may be bowed upwards 500 (in the z-axis) but are generally horizontal (i.e., in the x-y plane) and spaced from one another. The contacts 144(1)-144(M) are in a reverse S-shape, with a long z-axis that bows inwardly 502 to make contact with the contacts on the memory stick 300 and a short lower axis that bows downwardly 504 to contact the contacts 146(1)-146(M).

Figure 6A:
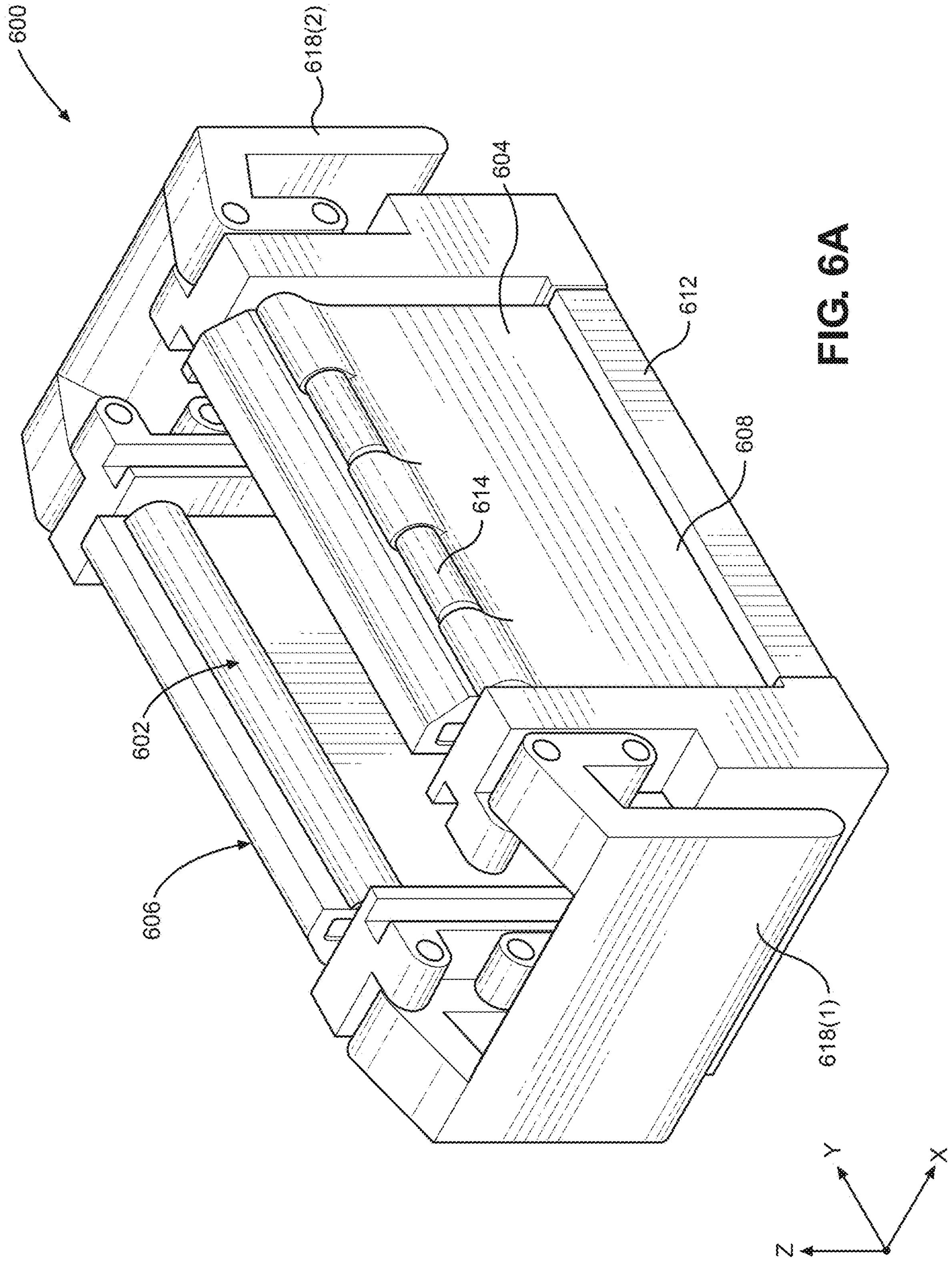
FIG. 6A is a top-front perspective view of a connector with a cantilever beam instead of hinges.
Figure 6B:
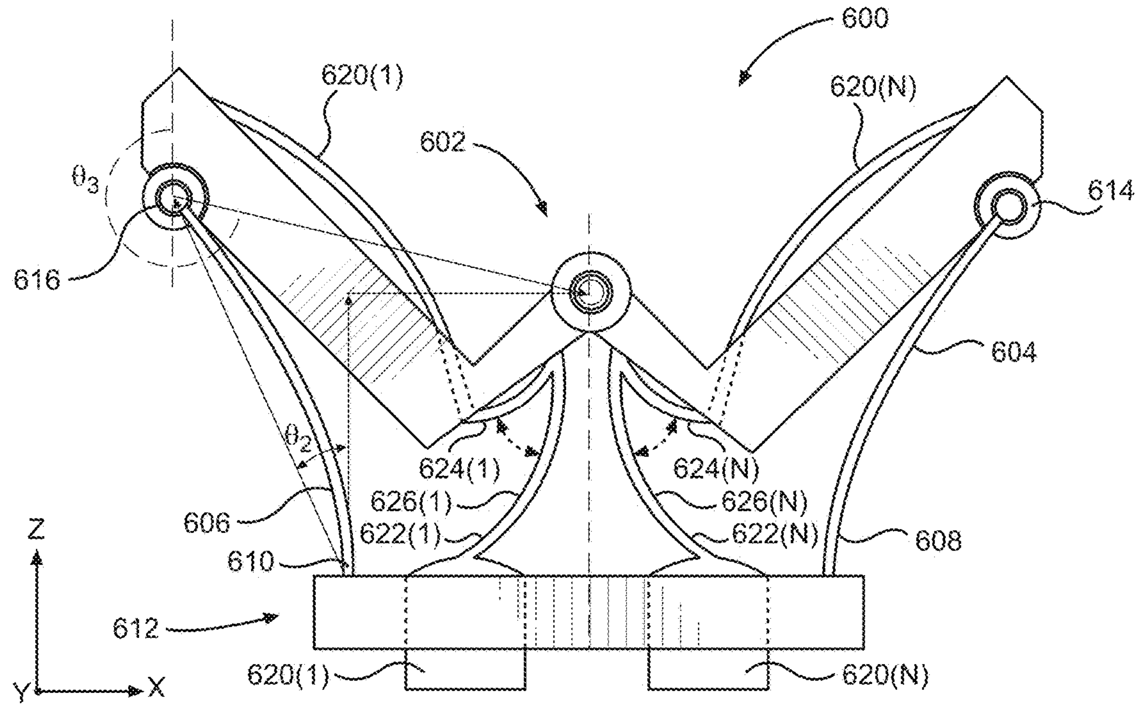
FIG. 6B is a cross-sectional end view of the connector of FIG. 6A.

While the connector 100 is one option, the present disclosure also contemplates other structures, for example, FIGS. 6A and 6B illustrate a connector 600 that uses a unitary conductor that has an accordion-like expansion and contraction during opening and closing of the cradle 602. This may also allow the elimination of one of the distinct hinges in the connector and allow movement at the base to be enabled by the elastic nature and flexibility of plastic. This approach may potentially provide a higher grip strength to hold the memory stick 300. The supports 124, 126 of connector 100 are replaced by the flexible cantilever beam 604, 606 with fixed joints 608, 610 at the base 612 and a hinged joints 614, 616 at the cradle interface.

Figure 8:
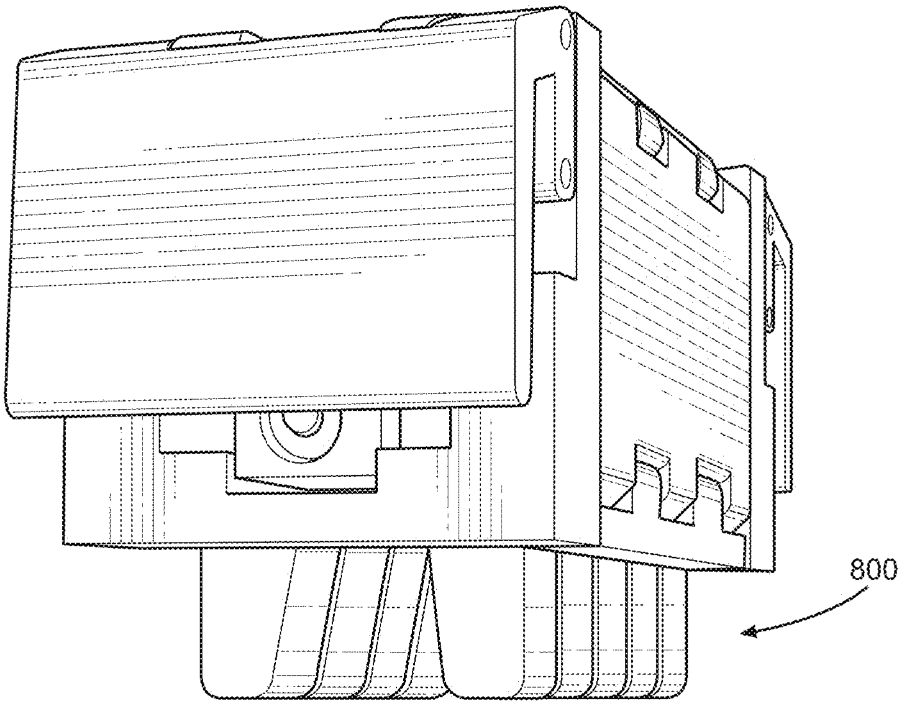
FIG. 8 is an isometric view of a connector according to aspects of the present disclosure, where the connector has extended contacts configured to couple to a first laminate structure.

Latch handles 618(1), 618(2) in FIG. 6A operate substantially similarly to the latch handles 106(1), 106(2) in FIG. 1. As better seen in FIG. 6B, respective ones of the contacts 144(1)-144(N) and 146(1)-146(M) are merged into a single set of contacts 620(1)-620(N). Lower portions 622(1)-622(N) act as a spring or allow for an accordion-like movement as leaves 624(1)-624(N) collapse against leaves 626(1)-626(N). Optionally, and not shown explicitly, the contacts 620(1)-620(N) may be embedded in a flexible substate to enhance strain relief and electrical performance. In particular, the leaves 626(1)-626(N) portion of the contacts 620(1)-620(N) may be so embedded. When collapses, the leaves 626(1)-626(N) may no longer compress directly against the leaves 624(1)-624(N) by virtue of the intervening substrate, but the electrical connection is maintained by the continuous nature of the contacts 620(1)-620(N).e FIG. 8 illustrates a connector with modified lower contacts 800, which may have a greater vertical height or be otherwise reshaped to help conform to contacts on the PCB to which the connector is being connected. These modified lower contacts 800 may be applied to any of the previously described connectors.

Figure 9:
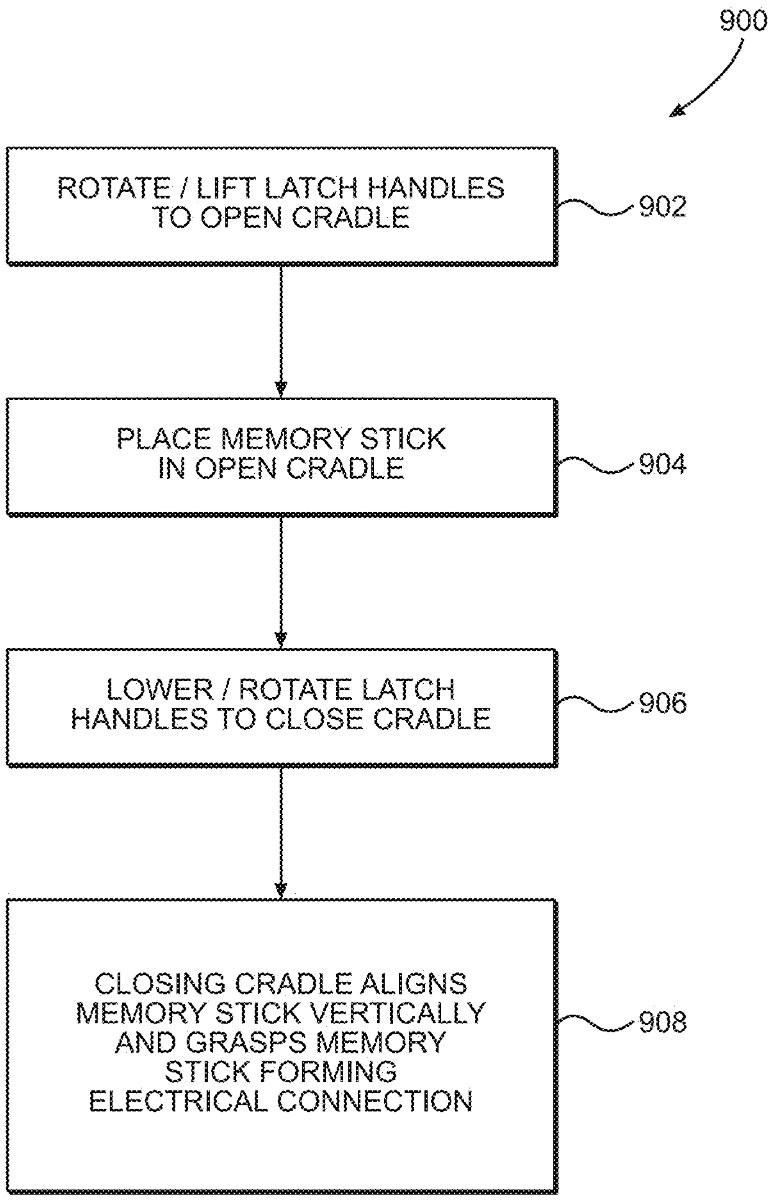
FIG. 9 is a flowchart illustrating an exemplary process for using a connector according to aspects of the present disclosure.

FIG. 9 provides a flowchart of a process 900 for using the connectors of the present disclosure. The process 900 begins by rotating or lifting the latch handles to open the cradle (block 902). The memory stick to be tested or used is placed in the open cradle (block 904). The latch handles are lowered or rotated down to close the cradle (block 906). The closing cradle aligns the memory stick vertically and grasps the memory stick forming an electrical connection (block 908).

Figure 10:
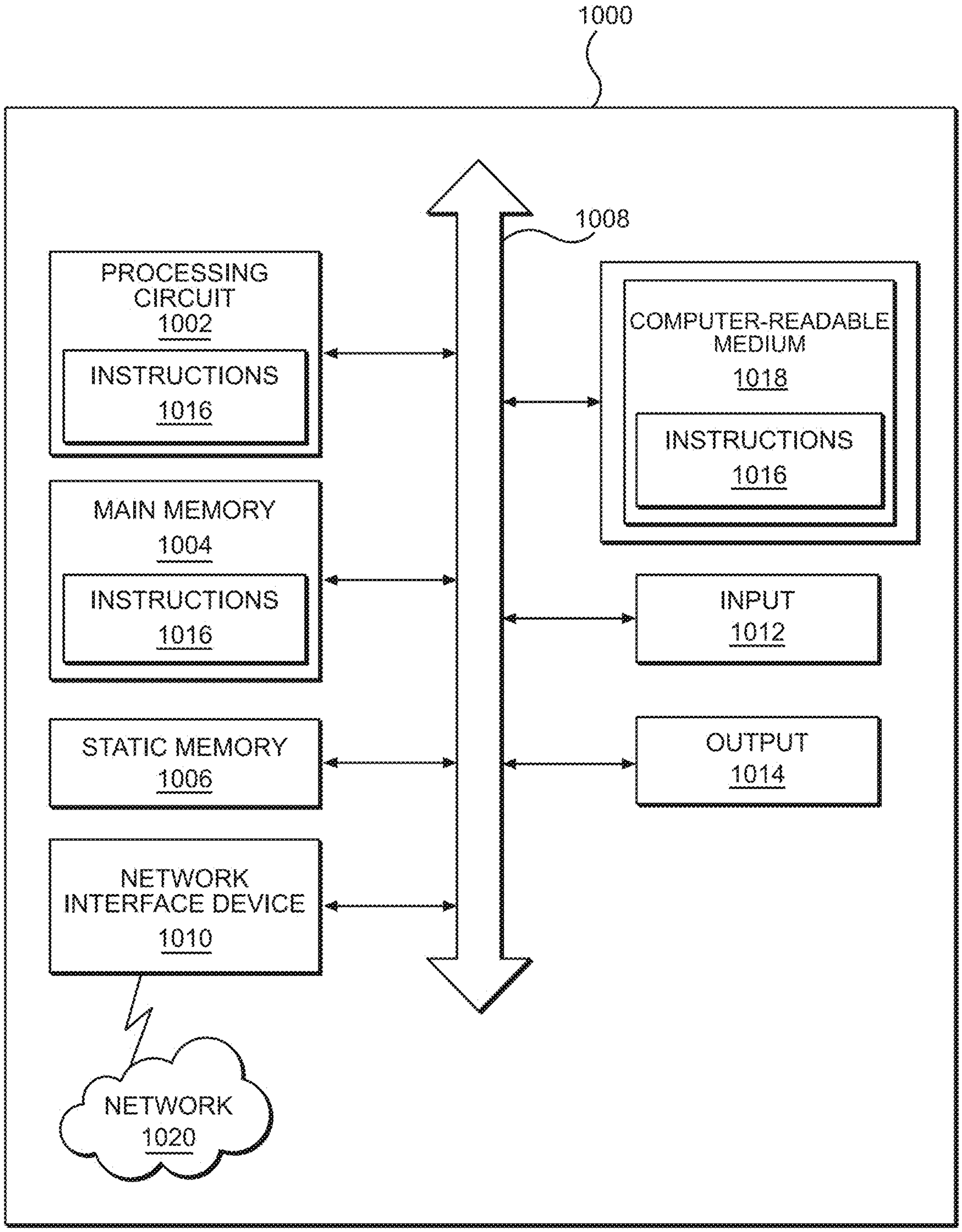
FIG. 10 is a block diagram of a computing device, which may include memory elements coupled to a motherboard using connectors according to the present disclosure.

FIG. 10 is a schematic diagram representation of additional detail illustrating a computer system 1000 that may have a connector 100 or 600 to hold memory sticks. In this regard, the computer system 1000 is adapted to execute instructions from an exemplary computer-readable medium to perform these and/or functions or processing. The computer system 1000 in FIG. 10 may include a set of instructions that may be executed to program and configure the functionality of the computer system 1000. The computer system 1000 may be connected (e.g., networked) to other machines in a LAN, an intranet, an extranet, or the Internet. The computer system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing circuit or processor 1002, a main memory 1004 (e.g., read-only memory (ROM), flash memory, dynamic random-access memory (DRAM), such as synchronous DRAM (SDRAM), etc.), and a static memory 1006 (e.g., flash memory, static random-access memory (SRAM), etc.), which may communicate with each other via a data bus 1008. The memories 1004, 1006 may be held, for example, by a connector 100 or 600 as describe above. Alternatively, the processor 1002 may be connected to the main memory 1004 and/or static memory 1006 directly or via some other connectivity means. The processor 1002 may be a controller, and the main memory 1004 or static memory 1006 may be any type of memory.

The processor 1002 represents one or more general-purpose processing devices, such as a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A connector configured to be coupled to a first laminate structure, the connector comprising:

a base comprising a longitudinal axis;

a pair of end pieces on either end of the base on the longitudinal axis;

a cradle comprising a pair of opposing jaws that open and close along a lateral axis perpendicular to the longitudinal axis, wherein each of the jaws comprises an interior face comprising contacts configured to couple electrically to a workpiece, each of the jaws also coupled to a plunger configured to move up and down in a track on a first one of the pair of end pieces; and a latch handle pivotably coupled to the plunger and configured to cause the plunger to move up or down in the track.

2. The connector of claim 1, further comprising a second plunger movably positioned in a second track on a second one of the pair of end pieces.

3. The connector of claim 2, further comprising a second latch handle pivotably coupled to the second plunger and configured to cause the second plunger to move up or down in the track.

4. The connector of claim 1, wherein the workpiece comprises a second laminate structure.

5. The connector of claim 4, wherein the second laminate structure comprises a memory stick.

6. The connector of claim 4, wherein the second laminate structure comprises a dual in-line memory module memory (DIMM) stick.

7. The connector of claim 1, further comprising second contacts electrically coupled to the contacts and configured to couple the connector electrically to the first laminate structure.

8. The connector of claim 1, wherein the contacts are formed from a flexible material forming part of the jaws.

9. The connector of claim 1, wherein the contacts are embedded in a flexible substrate or formed of continuous compliant material to couple the connector electrically to the first laminate structure.

10. The connector of claim 1, wherein when the jaws are closed, the cradle is configured to hold the workpiece vertically and securely.

11. The connector of claim 1, wherein the latch handle comprises a generally U-shaped handle.

12. A method of operating a connector, comprising:

placing a workpiece in an open cradle;

operating a latch handle to drive a plunger down; and responsive to the plunger moving down, closing jaws of the open cradle around the workpiece such that contacts on the jaws form an electrical connection with the workpiece.

13. The method of claim 12, wherein placing the workpiece in the open cradle comprises placing a memory stick in the open cradle.

14. The method of claim 12, wherein placing the workpiece in the open cradle comprises placing a dual in-line memory module memory (DIMM) stick in the open cradle.

15. The method of claim 12, further comprising forming an electrical connection with a laminate structure by attaching the connector to the laminate structure.

16. The method of claim 12, wherein closing the jaws comprises using a cantilever arrangement.

17. The method of claim 12, wherein operating the latch handle comprises rotating the latch handle downwardly thereby driving the plunger down.

18. The method of claim 17, wherein driving the plunger down comprises driving the plunger down in a track on an end piece of the connector.

19. The method of claim 12, further comprising locking the latch handle.

20. The method of claim 19, wherein locking is enabled by a toggle mechanism.

* * * * *